(12) United States Patent
Matlock

(10) Patent No.: US 10,794,031 B2
(45) Date of Patent: Oct. 6, 2020

(54) FOUNDATION PILE FOR A WIND TURBINE AND METHODS FOR MANUFACTURING A FOUNDATION PILE

(71) Applicant: INNOGY SE, Essen (DE)

(72) Inventor: Benjamin Matlock, Hamburg (DE)

(73) Assignee: INNOGY SE, Essen (DE)

( * ) Notice: Subject to any disclaimer, the term of this patent is extended or adjusted under 35 U.S.C. 154(b) by 0 days.

(21) Appl. No.: 16/080,288

(22) PCT Filed: Feb. 21, 2017

(86) PCT No.: PCT/EP2017/053931
§ 371 (c)(1),
(2) Date: Aug. 27, 2018

(87) PCT Pub. No.: WO2017/148746
PCT Pub. Date: Sep. 8, 2017

(65) Prior Publication Data
US 2019/0071833 A1 Mar. 7, 2019

(30) Foreign Application Priority Data

Feb. 29, 2016 (DE) ........................ 10 2016 203 268

(51) Int. Cl.
*B21C 37/08* (2006.01)
*E02D 5/28* (2006.01)
(Continued)

(52) U.S. Cl.
CPC .......... *E02D 5/285* (2013.01); *B21C 37/0803* (2013.01); *B21C 37/083* (2013.01);
(Continued)

(58) Field of Classification Search
CPC ............ E02D 5/28; E02D 5/285; B21C 37/08
(Continued)

(56) References Cited

U.S. PATENT DOCUMENTS

| 3,174,290 A * | 3/1965 | Maloney ................... E02D 7/30 |
| | | 405/246 |
| 2012/0177445 A1* | 7/2012 | Wendt ...................... E02D 5/08 |
| | | 405/211.1 |

(Continued)

FOREIGN PATENT DOCUMENTS

| DE | 1604195 U | 3/1950 |
| DE | 1484468 A1 | 5/1969 |

(Continued)

OTHER PUBLICATIONS

International Preliminary Report on Patentability dated Jan. 25, 2018 in International Application No. PCT/EP2017/053931, filed Feb. 21, 2017.

(Continued)

*Primary Examiner* — Sean D Andrish
(74) *Attorney, Agent, or Firm* — Wiley Rein LLP

(57) ABSTRACT

The invention discloses a foundation pile having at least two interconnected part-cylinder segments which are each produced from a steel plate having a length extent and a width extent, wherein the foundation pile is characterized in that the respective part-cylinder segments are produced by bending the steel plates along their width extent, with the result that end edges extending along the width extent of the part-cylinder segments have a bending, in that a height extent of the respective part-cylinder segments is greater than their width extent, and in that the longitudinal edges of the part-cylinder segments that extend along the height extent of the part-cylinder segments are arranged parallel to one another. The present invention further discloses a method for producing a foundation pile according to the invention.

8 Claims, 2 Drawing Sheets

(51) Int. Cl.
*B21C 37/083* (2006.01)
*F03D 13/20* (2016.01)
*E02D 27/42* (2006.01)

(52) U.S. Cl.
CPC ............ B21C 37/0815 (2013.01); E02D 5/28 (2013.01); *E02D 27/425* (2013.01); *F03D 13/22* (2016.05); *F05B 2240/91* (2013.01)

(58) Field of Classification Search
USPC .................................................. 405/231, 232
See application file for complete search history.

(56) References Cited

U.S. PATENT DOCUMENTS

2013/0309023 A1* 11/2013 Takagi .................. B21C 37/158
405/231

2014/0251595 A1* 9/2014 Buytaert ................. E21B 19/24
166/241.1
2016/0122968 A1* 5/2016 Jung ........................ E02D 7/14
405/232

FOREIGN PATENT DOCUMENTS

| | | | |
|---|---|---|---|
| GB | 461489 A | | 2/1937 |
| GB | 1203205 A | | 8/1970 |
| JP | 2000027176 A | | 1/2000 |
| JP | 2012167501 | * | 9/2012 |
| JP | 5527246 B2 | | 6/2014 |
| WO | 2010/010976 A1 | | 1/2010 |
| WO | 2015/017212 A1 | | 2/2015 |

OTHER PUBLICATIONS

International Search Report and Written Opinion dated Apr. 6, 2017 in PCT/EP2017/053931, filed Feb. 21, 2017.

* cited by examiner

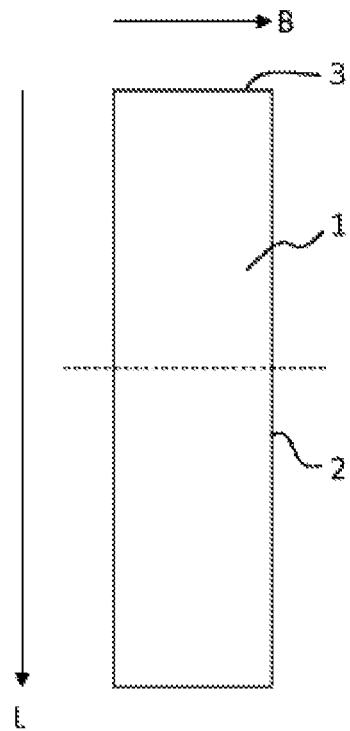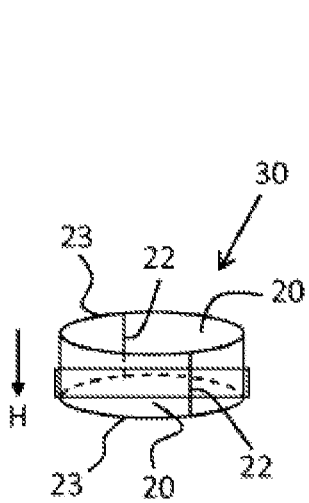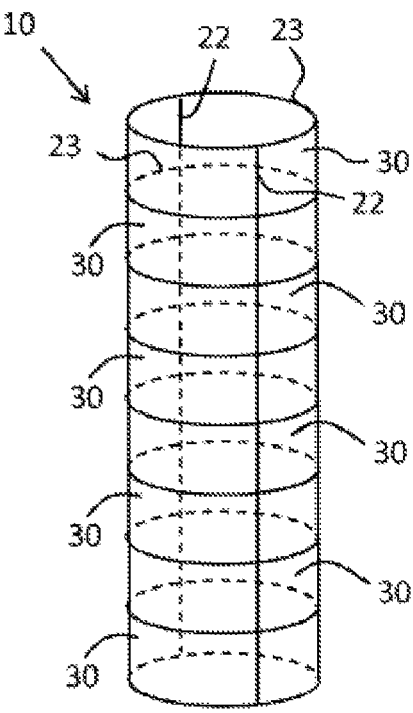
Fig. 1a
Fig. 1b (Prior Art)
Fig. 1c (Prior Art)
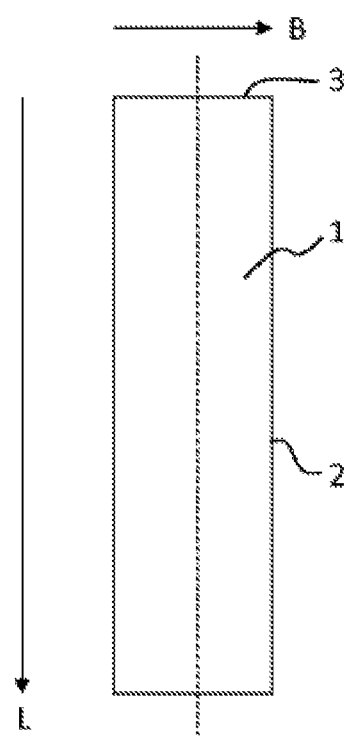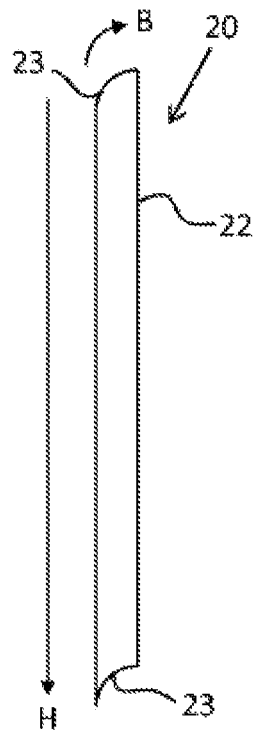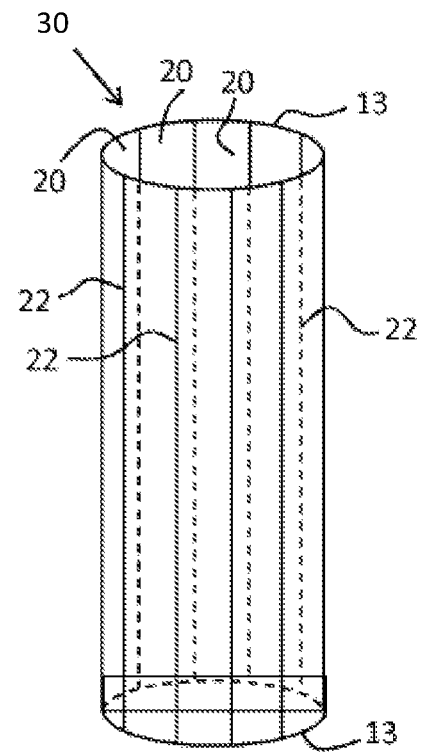
Fig. 2a
Fig. 2b
Fig. 2c

FOUNDATION PILE FOR A WIND TURBINE AND METHODS FOR MANUFACTURING A FOUNDATION PILE

RELATED APPLICATIONS

This Application is a § 371 National Stage Application of PCT/EP2017/053931, filed Feb. 21, 2017, which claims priority benefit of German Patent Application No. 102016203268.2, filed Feb. 29, 2016, which applications are incorporated entirely by reference herein for all purposes.

FIELD

The invention relates to a foundation pile with at least two interconnected part-cylinder segments which are each produced from a steel plate having a length extent and a width extent.

BACKGROUND ART

It is known from the prior art to erect foundation piles from foundation pile segments arranged one above each other and connected together. The foundation pile segments are in turn comprised of one, two or more part-cylinder segments each made from a bent steel plate.

The steel plates as a condition of production normally have a width extent of 3 meters and a length extent of up to 24 meters. To make the part-cylinder segments according to the prior art the steel plates are bent along their length extent so that the part-cylinder segments thus produced have a vertical extent corresponding to the width extent of the steel plate. If the steel plate consequently has a width extent of 3 m, then by bending the steel plate along the length extent a part-cylinder segment is produced with a height extent of 3 m. The foundation pile segment made from the part-cylinder segment/part-cylinder segments will consequently likewise have a height extent of 3 m.

If a foundation pile segment is only made from a single part-cylinder segment then the steel plate is bent along its length extent so that the longitudinal edges (material or sheet metal edges) opposite one another in the bent position can be welded to one another. Welding the opposing longitudinal edges is carried out by means of a longitudinal welded seam.

If a foundation pile segment is made from two or more part-cylinder segments, the part-cylinder segments are each connected together along the longitudinal edges by means of longitudinal welded seams. Then to connect the part-cylinder segments a number of longitudinal welded seams is required corresponding to the number of part-cylinder segments.

The foundation pie is then built up from a plurality of correspondingly formed foundation pile segments by connecting the mutually adjoining foundation pile segments to one another each by means of a round welded seam so that the respective longitudinal axes of the foundation pile segments run co-linearly relative to one another.

To make a corresponding foundation pile many welded seams are consequently required with a large overall length whereby the manufacture of the foundation pile is complicated and cost-intensive. For example, to make and connect two foundation pile segments which each have a height of 3 m and a diameter of 7 m, welded seams are required having an overall length of 28 m, namely twice 3 m longitudinal welded seams to connect the opposite side edges or material edges of the individual foundation pile segments, and 22 m round welded seam to connect the two foundation pile segments.

SUMMARY OF THE INVENTION

The object of the present invention is to provide a foundation pile whose manufacture is possible within a shortened time, which is more cost-effective and which has increased stability. The present invention is further concerned with providing a method for manufacturing a foundation pile by means of which the complexity, manufacturing costs and manufacturing time can be considerably reduced.

The object of the present invention is achieved by a foundation pile comprising at least two interconnected part-cylinder segments as described herein. Advantageous embodiments of the foundation pile are described. The present invention is further concerned with providing a method for manufacturing a foundation pile.

More precisely the object of the present invention is achieved by a foundation pile which comprises at least two part-cylinder segments which are connected to one another and which are each formed by steel plate having a length extent and a width extent. The part-cylinder segments are produced by bending the steel plates along their width extent so that end edges extending along the width extent of the part-cylinder segments comprise a bend. The height extent of the respective part-cylinder segments is then greater than their width extent. The longitudinal edges of the part-cylinder segments extending along the height extent of the part-cylinder segments are arranged parallel to one another.

A corresponding formation of the foundation pile enables the overall welded seam length to be significantly reduced to produce the foundation pile. More particularly in the case of foundation piles having a diameter of more than 7 m the overall welded seam length is reduced compared with the foundation piles known from the prior art. As a result, the time and costs for manufacturing a foundation pile according to the invention are thus also reduced.

According to the invention the length extent of the steel plate is to mean that this is greater than the width extent of the steel plate.

With the foundation pile according to the invention, by bending a steel plate along its width extent broad edges of the steel plate (material edges of the steel plate extending along the width extent) become end edges or round edges of the part-cylinder segment, and longitudinal edges of the steel plate by bending the steel plate along their width extent become longitudinal edges of the part-cylinder segment. The height extent of the part-cylinder segments consequently corresponds to the length extent of the steel plates from which the part-cylinder segments are produced by bending along the width extent of the steel plate. If by way of example with a foundation pile according to the invention a part-cylinder segment is made from a steel plate with a width extent of 3 m and a length extent of 20 m by bending the steel plate along its width extent, this part-cylinder segment has a height extent of 20 m and a width extent of 3 m.

The width extent of a part-cylinder segment can also be termed a peripheral extent.

Compared to this, with foundation piles known from the prior art by bending a steel plate along the length extent of the steel plate the broad edges of the steel plate become longitudinal edges of the part-cylinder segment, and longitudinal edges of the steel plate become end edges of the part-cylinder segment by bending the steel plate along the length extent of the steel plate. The height extent of the part-cylinder segments consequently corresponds to the width extent of the steel plates from which the part-cylinder segments are made by bending the length extent of the steel plate.

The width extent of the respective steel plates from which part-cylinder segments are made by bending, normally amounts to 3 m whilst the length extent of the steel plates from which the part-cylinder segments are formed can amount to up to 24 m.

The longitudinal edges of the respective part-cylinder segments are arranged parallel to one another and are consequently arranged opposite one another. The longitudinal edges of the part-cylinder segments can be spaced from one another or connected to one another.

A foundation pile according to the invention preferably comprises more than two, namely, three, four, five, six, seven, eight or more part-cylinder segments connected to one another. There are thus no restrictions on the number of part-cylinder segments. The number of part-cylinder segments from which the foundation pile is made is only dependent on the diameter of the foundation pile and the respective length extent of the steel plates from which the part-cylinder segments are formed.

The part-cylinder segments are preferably each made from just one steel plate by bending along the width extent of the steel plate.

More preferably the interconnected part-cylinder segments whose respective longitudinal edges are arranged parallel to one another, form one foundation pile segment wherein the foundation pile comprises at least two foundation pile segments whose longitudinal axes run substantially co-linear to one another and whose end edges are connected to one another.

Taller foundation piles can be formed through a corresponding design of the foundation pile. Connecting the end edges of two foundation pile segments can be carried out by welding the end edges to one another. The foundation pile segments can furthermore also be connected to one another by means of holding brackets. In the sense of the present invention co-linear axes mean that the axes coincide substantially with one another, i.e. that these have no lateral off-set stagger relative to one another.

The foundation pile is preferably designed so that the respective part-cylinder segments each define a longitudinal axis wherein the longitudinal axes of the respective part-cylinder segments run parallel to a longitudinal axis of the foundation pile.

The longitudinal axes of the part-cylinder segments can then run parallel off-set relative to the longitudinal axis of the foundation pile. The bending radius of the part-cylinder segments can be smaller than the radius of curvature of the foundation pile, more precisely than the radius of curvature of an envelope of the foundation pile.

The longitudinal edges of mutually adjoining part-cylinder segments are then preferably connected to one another. This connection can be achieved by way of example by longitudinal welded seams. Mutually adjoining part-cylinder segments can furthermore also be connected to one another by means of holding brackets. These holding brackets can be arranged by way of example on the insides of the part-cylinder segments and can be screwed to the part-cylinder segments.

The longitudinal axes of the part-cylinder segments can preferably run co-linear to the longitudinal axis of the foundation pile or to the longitudinal axis of the envelope of the foundation pile. The longitudinal axes of the part-cylinder segments then consequently coincide with the longitudinal axis of the foundation pile.

The foundation pile is further preferably designed so that the bending radii of the respective part-cylinder segments correspond to a radius of curvature of the foundation pile.

In a plan view of the foundation pile the bending radii of the part-cylinder segments therefore coincide with the radius of curvature of the foundation pile. The longitudinal edges of mutually adjoining part-cylinder segments are then preferably connected to one another. This connection can be achieved by way of example by longitudinal welded seams. Mutually adjoining part-cylinder segments can furthermore also be connected to one another by means of holding brackets. These holding brackets can be arranged by way of example on the insides of the part-cylinder segments and screwed to the part-cylinder segments.

According to an advantageous embodiment of the foundation piles the respective bending radii of the respective part-cylinder segments are smaller than a radius of curvature of the foundation pile.

Since the bending radii of the part-cylinder segments are smaller than the radius of curvature of the foundation pile the rigidity of the correspondingly formed foundation pile is increased.

Also, with this embodiment the longitudinal edges of mutually adjoining part-cylinder segments can be connected to one another. This connection can be achieved by longitudinal welded seams. Alternatively or additionally to a corresponding connection the mutually adjoining part-cylinder segments can also be connected to one another by means of holding brackets. These holding brackets can then be arranged on the insides of the part-cylinder segments and screwed to the part-cylinder segments.

The foundation pile is preferably designed so that mutually adjoining longitudinal edges of the respective part-cylinder segments are connected to one another. The connection of mutually adjoining longitudinal edges of the part-cylinder segments can as already described above be achieved by welding and/or by holding brackets which are connected by way of example to the insides of the part-cylinder segments.

Since the bending radii of the part-cylinder segments are smaller than the radius of curvature of the foundation pile the rigidity, more particularly the lateral rigidity, of the correspondingly formed foundation pile is increased. The wall thickness of the part-cylinder segments can thereby be reduced, whereby the expense by way of example of welding the part-cylinder segments to one another and the foundation pile segments to one another is reduced. By reducing the wall thickness of the part-cylinder segments the weight of the foundation pile segments and foundation pile is also reduced.

The foundation pile preferably comprises a stabilizing device which is arranged inside the foundation pile wherein the stabilizing device is connected to the insides of the part-cylinder segments.

Through a corresponding design of the foundation pile, the rigidity, more particularly the lateral rigidity, of the foundation pile is further increased. The wall thicknesses of the part-cylinder segments can thereby be reduced whereby the expense by way of example of welding the part-cylinder segments to one another and foundation pile segments to one another is reduced. By reducing the wall thickness of the part-cylinder segments the weight of the foundation pile segments and foundation pile is further reduced.

The stabilizing device can comprise by way of example reinforcement stays which are connected to the mutually adjoining and/or mutually opposing part-cylinder segments. The part-cylinder segments can thus be better supported relative to one another whereby the lateral rigidity of the foundation pile is considerably increased.

According to a preferred embodiment the foundation pile is designed so that the longitudinal edges of mutually adjoining part-cylinder segments are spaced from one another so that the foundation pile has through openings between the respective longitudinal edges of the part-cylinder segments.

The correspondingly designed foundation pile offers improved flow advantages since the through openings in the foundation pile can be arranged so that a fluid, thus air or water (the latter in the case of offshore use) can readily enter into the foundation pile and the fluid can readily exit the foundation pile so that the foundation pile offers a reduced contact surface for air and/or water. A further advantage of the correspondingly designed foundation pile is that cathodic corrosion protection can act both inside the foundation pile and also on the outside of the foundation pile so that only a single corrosion protection system need be used. Furthermore through a corresponding design of the foundation pile the length of the welded seams which are required for producing the foundation pile can again be reduced.

The object of the present invention is further achieved by a method for manufacturing a foundation pile comprising at least two part-cylinder segments connected to one another, wherein the method is characterized in that the respective part-cylinder segments are formed by bending each one steel plate which has a length extent and a width extent, along the width extent of the steel plates so that end edges extending along the width extent of the part-cylinder segments have a bend, and so that a height extent of the part-cylinder segments is greater than their width extent wherein the longitudinal edges of the part-cylinder segments extending along the height extent of the part-cylinder segments are arranged parallel to one another.

BRIEF DESCRIPTION OF THE DRAWINGS

Further advantages, details and features of the invention are apparent from the following explanation of exemplary embodiments. In the drawings:

FIG. 1a shows a plan view of a steel plate having a length extent and a width extent, with a diagrammatically illustrated bending axis running parallel to the width extent;

FIG. 1b shows a perspective view of a foundation pile segment known from the prior art;

FIG. 1c shows a perspective view of a foundation pile known from the prior art;

FIG. 2a shows a plan view of a steel plate having a length extent and a width extent, with a diagrammatically illustrated bending axis running parallel to the length extent;

FIG. 2b shows a perspective view of a part-cylinder segment of a foundation pile according to the invention;

FIG. 2c shows a perspective view of a foundation pile according to the invention;

DETAILED DESCRIPTION OF THE EMBODIMENTS

Figure 3:
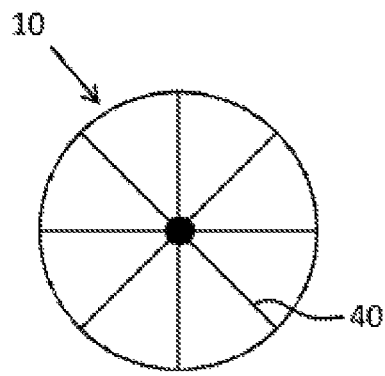
FIG. 3 shows a plan view of an end edge of a foundation pile according to a further embodiment of the present invention.

In the following description the same reference numerals are used for the same components or same features so that a description relating to one component with reference to one figure will also apply to the other figures so that a repeat description will be avoided. Individual features which were described in connection with one embodiment can furthermore also be used separately for other embodiments.

FIG. 1a shows a plan view of a steel plate 1 which comprises a length extent L and a width extent B. A longitudinal edge 2 of the steel plate 1 extends along the length extent L of the steel plate 1, and a broad edge 3 extends along the width extent B of the steel plate 1. The length extent L of the steel plate 1 is greater than its width extent B. Normally due to production constraints the steel plate 1 has a width extent of 3 m and a length extent of up to 24 m.

FIG. 1b shows a perspective view of a foundation pile segment 30, known from the prior art, of a foundation pile 10 illustrated in FIG. 1c and likewise known from the prior art. The foundation pile segment 30 is made from two steel plates 1, illustrated in FIG. 1a, whereby each steel plate 1 is bent along its length extent L into part-cylinder segments 20. By bending the steel plate 1 along its length extent L the steel plate 1 is bent about the bending axis illustrated in dotted lines in FIG. 1a.

By bending the steel plate 1 along its length extent L the broad edges 3 of the steel plate 1 become longitudinal edges 22 of a part-cylinder segment 20 The longitudinal edges 2 of the steel plate 1 on the other hand become the end edges 23 of the part-cylinder segment 20. A height extent H of the part-cylinder segments 20 consequently corresponds to the width extent B of the steel plates from which the part-cylinder segments 20 are produced by bending along the length extent L of the steel plates 1. The two part-cylinder segments 20 are connected to one another along their longitudinal edges 22 by means of longitudinal welded seams whereby the foundation pile segment 30 is created.

FIG. 1c shows a foundation pile 10 known from the prior art and made from eight foundation pile segments 30 illustrated in FIG. 1b. The foundation pile segments 30 adjoining the end edges 23 are connected together by round welded seams. Consequently, to make the foundation pile 10 illustrated in FIG. 1c sixteen longitudinal welded seams are required each with a single length of 3 m and seven round welded seams each with a single length of 22 m.

FIG. 2a shows again a steel plate 1 which has a length extent L and a width extent B wherein a longitudinal edge 2 of the steel plate 1 extends along its length extent L, and wherein a width edge 3 of the steel plate 1 extends along its width extent B. FIG. 2a shows a bending axis in chain dotted lines wherein by bending the steel plate 1 about the chain dotted line bending axis the steel plate 1 is bent along its width extent B.

FIG. 2b shows a part-cylinder segment 20 of a foundation pile 10 according to the invention illustrated in FIG. 2c likewise in a perspective view. The part-cylinder segment 20 is then produced by bending the steel plate 1 shown in FIG. 2a along its width extent B so that the end edge 23 extending along the width extent B of the part-cylinder segment 20 has a bend. The height extent H of the part-cylinder segment 20 is then greater than its width extent B. If by way of example the steel plate 1 has a width extent B of 3 m and a length extent L of 24 m, then by bending the steel plate 1 along its width extent B a part-cylinder segment 20 is produced with a height extent of 24 m and a width extent of 3 m.

It is apparent from FIG. 2c that the foundation pile 10 is formed from eight part-cylinder segments 20 shown in FIG. 2b wherein the longitudinal edges 22 of mutually adjoining part-cylinder segments 20 are connected to one another. This connection of the longitudinal edges 22 can be produced by way of example by longitudinal welded seams. It is however furthermore also possible that the connection between the respective part-cylinder segments 20 is made by holding brackets (not shown in the figures). The holding brackets can then be connected by way of example to the insides of the part-cylinder segments 20.

The eight interconnected part-cylinder segments 20 form one foundation pile segment 30. Two foundation pile segments 30 can be connected to one another by welding the end edges of the foundation pile segments 30 in order to produce one foundation pile 10 with a greater height extent H.

FIG. 3 shows a plan view of a foundation pile 10 according to an advantageous embodiment of the present invention. The foundation pile 10 shown in FIG. 3 is likewise formed from eight part-cylinder segments 20 whose bending radii correspond to a radius of curvature of the foundation pile 10. Therefore, in a plan view of the foundation pile 10, the bending radii of the part-cylinder segments 20 coincide with the radius of curvature of the foundation pile 10. The longitudinal edges 22 of the part-cylinder segments 20 are connected to one another so that the foundation pile 10 shown in FIG. 3 has a closed shell wall. With regard to these features the foundation pile 10 illustrated in FIG. 3 is consequently identical with the foundation pile 10 illustrated in FIG. 2c. However the foundation pile 10 illustrated in FIG. 3 further comprises a stabilizing device 40 which is arranged inside the foundation pile 10. The stabilizing device 40 is connected here to the insides of the part-cylinder segments 20.

In the case of the illustrated exemplary embodiment two part-cylinder segments 20 arranged opposite one another are connected to one another by means of a stabilizing stay belonging to the stabilizing device 40. Through a corresponding design of the foundation pile 10 the latter has an increased lateral rigidity so that the wall thickness of the part-cylinder segments 20 and thus the wall thickness of the foundation pile 10 can be reduced. It is further apparent from FIG. 3 that the respective stabilizing stays of the stabilizing device 40 are each also connected to one another so that the stabilizing device 40 further also connects two mutually adjoining part-cylinder segments 30 to one another. The stabilizing stays of the stabilizing device 40 can be arranged in a horizontal plane in the assembled state of the stabilizing device 40 and in the installed position of the foundation pile 10, that is when the foundation pile 10 is connected to a foundation base. The stabilizing stays of the stabilizing device 40 can however furthermore also be aligned at an angle to a horizontal plane.

Figure 4:
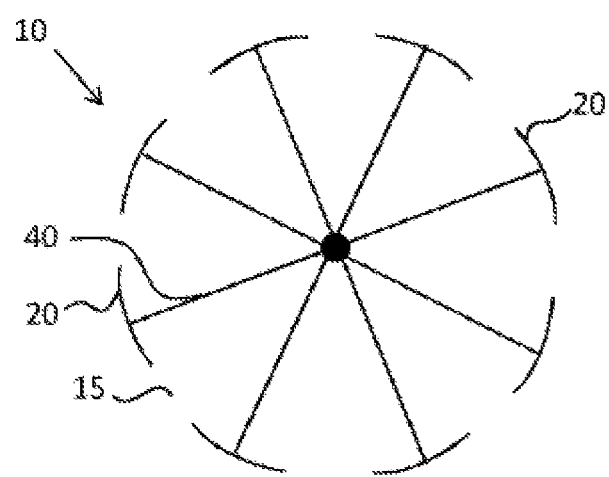
FIG. 4 shows a plan view of an end edge of a foundation pile according to a further embodiment of the present invention.

FIG. 4 shows a further advantageous embodiment of the foundation pile 10 according to the invention. The bending radii of the respective part-cylinder segments 20 correspond to a radius of curvature of the foundation pile 10, but mutually adjoining longitudinal edges 22 of the respective part-cylinder segments 20 are not connected to one another. Furthermore mutually adjacent part-cylinder segments 20 are spaced from one another so that the foundation pile 10 has through openings 15 between the respective longitudinal edges 22 of the part-cylinder segments 10.

The foundation pile 10 illustrated in FIG. 4 therefore offers technical advantages regarding the flow since the through openings 15 in the foundation pile 10 are arranged so that fluid, thus air or water (the latter in offshore use), can readily flow into the foundation pile 10 and out from the foundation pile 10 so that the foundation pile 10 offers a reduced contact surface for air and/or water. Furthermore with the corresponding design of the foundation pile 10 it is possible that cathodic corrosion protection can act both inside the foundation pile 10 and also on the outside of the foundation pile 10 so that only a single corrosion protection system need be used. A corresponding design of the foundation pile 10 furthermore has the advantage that the length of the welded seams for producing the foundation pile 10 is once more reduced.

Part-cylinder segments 20 of the foundation pile 10 opposite one another are connected to each other by means of stabilizing stays of the stabilizing device 40. The respective stabilizing stays of the stabilizing device 40 are furthermore connected to one another so that part-cylinder segments 20 which are adjacent one another are connected to each other by means of the stabilizing device 40. The foundation pile 10 illustrated in FIG. 4 furthermore consequently has an increased lateral rigidity.

Figure 5:
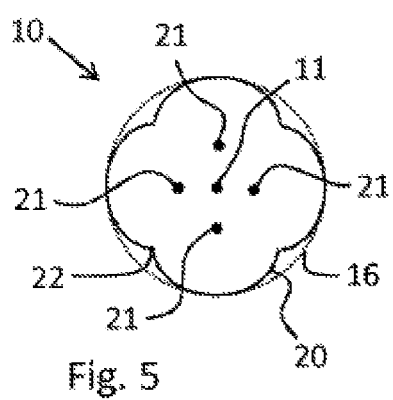
FIG. 5 shows a plan view of an end edge of a foundation pile according to a further embodiment of the present invention.
Figure 7:
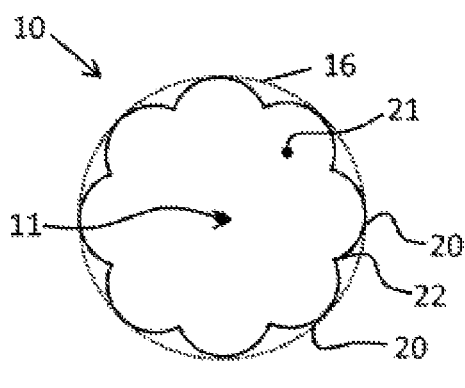
FIG. 7 shows a plan view of an end edge of a foundation pile according to a further embodiment of the present invention.

FIGS. 5 and 7 each show in plan view an end edge of the foundation pile 10 of a pile according to a further advantageous embodiment of the present invention. The foundation pile 10 shown in FIG. 5 then consists of four part-cylinder segments 20 whilst the foundation pile 10 illustrated in FIG. 7 is formed from eight part-cylinder segments 20. Elsewhere the foundation piles 10 illustrated in FIGS. 5 and 7 have an identical construction.

The bending radii of the part-cylinder segments 20 are smaller than a radius of curvature of an envelope 16 of the foundation pile 10. The mutually adjoining part-cylinder segments 20 are thereby connected to one another by connecting their respective longitudinal edges 22 to one another. The longitudinal axes 21 of the respective part-cylinder segments 20 each run parallel to the longitudinal axis 11 of the foundation pile 10 but are not aligned co-linear with the longitudinal axis 11 of the foundation pile 10.

The foundation piles 10 illustrated in FIGS. 5 and 7 have an increased lateral rigidity owing to the feature where the bending radii of the respective part-cylinder segments 20 are smaller than the radius of curvature of the envelope 16 of the foundation pile 10, whereby the wall thicknesses of the part-cylinder segments 20 can be reduced, which has the result that the expense for example of welding the part-cylinder segments 20 is reduced. Furthermore as a result of reducing the wall thickness of the part-cylinder segments 20 the weight of the foundation pile 10 is also reduced.

Figure 6:
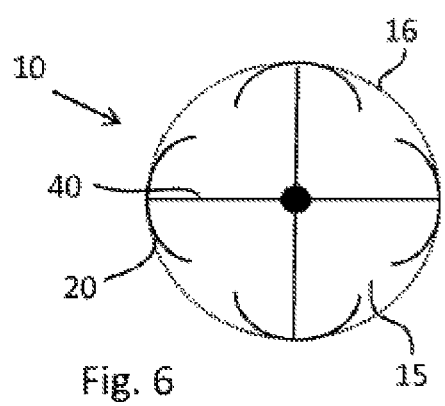
FIG. 6 shows a plan view of an end edge of a foundation pile according to a further embodiment of the present invention.

FIG. 6 shows a further advantageous design of the foundation pile 10 according to the invention. The foundation pile 10 comprises four part-cylinder segments 20 wherein this embodiment is not restricted to the foundation pile 10 having only four part-cylinder segments 20. Obviously the foundation pile 10 can also have more or fewer than four part-cylinder segments 20. The part-cylinder segments 20 each have a smaller bending radius than the radius of curvature of the envelope 16 of the foundation pile 10. The part-cylinder segments 20 are spaced from one another so that the longitudinal edges 22 of the part-cylinder segments 20 are not connected to one another so that through openings 15 are formed between the respective part-cylinder segments 20. The part-cylinder segments 20 are connected to one another by means of a stabilizing device 40. The stabilizing device 40 comprises stabilizing stays which are arranged so that each two part-cylinder segments 20 arranged opposite one another are connected to one another by means of a stabilizing stay. The stabilizing stays of the stabilizing device 40 are further connected to one another so that part-cylinder segments 20 which are adjacent one another are connected to each other by means of the stabilizing device 40.

The foundation pile 10 illustrated in FIG. 6 is thus far comparable with the foundation pile 10 illustrated in FIG. 4 wherein the two foundation piles 10 only differ in that the radii of curvature of the part-cylinder segments 20 of the foundation pile 10 illustrated in FIG. 6 are smaller than the radius of curvature of the envelope 16 of the foundation pile 10, and that the foundation pile 10 illustrated in FIG. 6 has only four part-cylinder segments.

Figure 8:
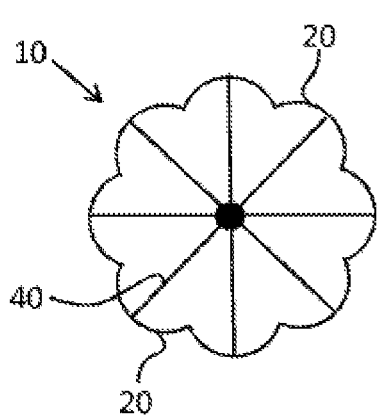
FIG. 8 shows a plan view of an end edge of a foundation pile according to a further embodiment of the present invention.

FIG. 8 shows a foundation pile 10 according to a further advantageous configuration of the present invention. This foundation pile 10 is similar to the foundation pile 10 illustrated in FIG. 7 wherein the foundation pile illustrated in FIG. 8 comprises further a stabilizing device 40 which is arranged inside the foundation pile 10. The stabilizing device 40 comprises stabilizing stays which connect the mutually opposing part-cylinder segments 20 to one another. As a result of the fact that the stabilizing stays are also connected to one another, part-cylinder segments 20 which are also adjacent one another are connected to one another by means of the stabilizing device 40. The correspondingly formed foundation pile 10 therefore has an increased lateral rigidity whereby the wall thickness of the respective part-cylinder segments 20 can be reduced.

REFERENCE NUMERAL LIST

1 Steel plate
2 Longitudinal edge (of the steel plate)
3 Broad edge (of the steel plate)
10 Foundation pile
11 Longitudinal axis (of the foundation pile)
13 End edge (of the foundation pile)
15 Through opening (of the foundation pile)
16 Envelope (of the foundation pile)
20 Part-cylinder segment
21 Longitudinal axis (of the part-cylinder segment)
22 Longitudinal edge (of the part-cylinder segment)
23 End edge/End side (of the part-cylinder segment)
30 Foundation pile segment
31 Longitudinal axis (of the foundation pile segment)
32 Longitudinal edge/sheet metal edge/material edge (of the foundation pile segment)
33 End edge (of the foundation pile segment)
Longitudinal axis (of the foundation pile segment)
40 Stabilizing device/stabilizing stay
B Width extent (of the steel plate)
H Height extent (of the part-cylinder segment and foundation pile segment)
L Longitudinal extent (of the steel plate)

The invention claimed is:

1. A foundation pile (10) comprising at least two interconnected part-cylinder segments (20), each part-cylinder segment having a width extent and a height extent, wherein
   each part-cylinder segment is made from a steel plate (1) having a length extent (L) and a width extent (B);
   the respective part-cylinder segments (20) are each made by bending the steel plates (1) along the width extent (B) of the respective part-cylinder segments (20) so that end edges of the respective part-cylinder segments (23) extending along the width extent (B) of the part-cylinder segments (20) have a bend;
   the height extent (H) of the respective part-cylinder segments (20) is greater than the width extent (B) of the respective part-cylinder segments (20);
   longitudinal edges (22) of the part-cylinder segments (20) extending along the height extent (H) of the part-cylinder segments (20) are arranged parallel to one another;
   the longitudinal edges (22) of the interconnected part-cylinder segments (20) are arranged parallel to one another to form a foundation pile segment (30);
   the foundation pile (10) comprises at least two foundation pile segments (30) whose longitudinal axes (31) run substantially co-linear with one another and whose end edges (33) are connected to one another; and
   the longitudinal edges (22) of mutually adjoining part-cylinder segments (20) are configured to be connected to one another by longitudinal weld seams to form the foundation pile (10) having a diameter of more than 7 meters for carrying a wind turbine in offshore use.

2. The foundation pile (1) of claim 1, wherein the longitudinal axis of the respective part-cylinder segments (20) runs parallel to a longitudinal axis (11) of the foundation pile (10).

3. The foundation pile (10) of claim 1, wherein bending radii of the respective part-cylinder segments (20) correspond to a radius of curvature of the foundation pile (10).

4. The foundation pile (10) of the claim 1, wherein the bending radii of the respective part-cylinder segments (20) are smaller than the radius of curvature of the foundation pile (10).

5. The foundation pile (10) of claim 1, further comprising a stabilizing device (40) arranged inside the foundation pile, wherein the stabilizing device (40) is connected to the inner sides of the part-cylinder segments (20).

6. A foundation pile (10) comprising at least two interconnected part-cylinder segments (20), each part-cylinder segment having a width extent and a height extent, wherein
   each part-cylinder segment is made from a steel plate (1) having a length extent (L) and a width extent (B);
   the respective part-cylinder segments (20) are each made by bending the steel plates (1) along the width extent (B) of the respective part-cylinder segments (20) so that end edges of the respective part-cylinder segments (23) extending along the width extent (B) of the part-cylinder segments (20) have a bend;
   the height extent (H) of the respective part-cylinder segments (20) is greater than the width extent (B) of the respective part-cylinder segments (20);
   longitudinal edges (22) of the part-cylinder segments (20) extending along the height extent (H) of the part-cylinder segments (20) are arranged parallel to one another;
   the longitudinal edges of the interconnected part-cylinder segments (20) are arranged parallel to one another to form a foundation pile segment (30);

the foundation pile (10) comprises at least two foundation pile segments (30) whose longitudinal axes (31) run substantially co-linear with one another and whose end edges (33) are connected to one another;

the foundation pile (10) further comprises a stabilizing device (40) arranged inside the foundation pile, wherein the stabilizing device (40) is connected to inner sides of the part-cylinder segments (20), wherein the longitudinal edges (22) of the mutually adjoining part-cylinder segments (20) are spaced from one another so that the foundation pile (10) has through openings (15) between the respective longitudinal edges (22) of the part-cylinder segments (20), and wherein bending radii of the respective part-cylinder segments (20) are smaller than a radius of curvature of the foundation pile (10); and the foundation pile (10) is configured to have a diameter of more than 7 meters for carrying a wind turbine in offshore use.

7. A method for manufacturing a foundation pile (10) comprising at least two interconnected part-cylinder segments (20), each part-cylinder segment having a width extent and a height extent, comprising:

bending a steel plate (1) having a length extent (L) and a width extent (B), along the width extent (B) of the steel plate (1), to produce the respective part-cylinder segments (20), so that end edges of the respective part-cylinder segments (23) extending along the width extent (B) of the respective part-cylinder segments (20) have a bend, and so that the height extent (H) of the respective part-cylinder segments (20) is greater than the width extent (B), wherein longitudinal edges (22) of the part-cylinder segments (20) extending along the height extent (H) of the part-cylinder segments (20) are arranged parallel to one another;

the longitudinal edges (22) of the interconnected part-cylinder segments (20) are arranged parallel to one another to form a foundation pile segment (30);

the foundation pile (10) comprises at least two foundation pile segments (30) whose longitudinal axes (31) run substantially co-linear with one another and whose end edges (33) are connected to one another; and connecting the longitudinal edges (22) of mutually adjoining part-cylinder segments (20) by longitudinal weld seams to form the foundation pile (10) having a diameter of more than 7 meters for carrying a wind turbine in offshore use.

8. A method for manufacturing a foundation pile (10) of claim 6 comprising at least two interconnected part-cylinder segments (20), each part-cylinder segment having a width extent and a height extent, comprising:

bending a steel plate (1) having a length extent (L) and a width extent (B), along the width extent (B) of the steel plate (1), to produce the respective part-cylinder segments (20), so that end edges of the respective part-cylinder segments (23) extending along the width extent (B) of the respective part-cylinder segments (20) have a bend, and so that the height extent (H) of the respective part-cylinder segments (20) is greater than the width extent (B) of the respective part-cylinder segments (20), wherein longitudinal edges (22) of the part-cylinder segments (20) extending along the height extent (H) of the part-cylinder segments (20) are arranged parallel to one another;

the foundation pile (10) comprises at least two foundation pile segments (30) whose longitudinal axes (31) run substantially co-linear with one another and whose end edges (33) are connected to one another; and connecting the inner sides of the part-cylinder segments (20) by a stabilizing device (40) arranged inside the foundation pile (10), wherein the longitudinal edges (22) of the mutually adjoining part-cylinder segments (20) are spaced from one another so that the foundation pile (10) has through openings (15) between the respective longitudinal edges (22) of the part-cylinder segments (20), and wherein the bending radii of the respective part-cylinder segments (20) are smaller than the radius of curvature of the foundation pile (10).

* * * * *